United States Patent [19]

Billingsley et al.

[11] 4,421,985
[45] Dec. 20, 1983

[54] DARK FIELD INFRARED TELESCOPE

[75] Inventors: James D. Billingsley, Arlington; Dayton D. Eden, Dallas, both of Tex.

[73] Assignee: Vought Corporation, Dallas, Tex.

[21] Appl. No.: 279,151

[22] Filed: Jun. 30, 1981

[51] Int. Cl.³ .............................. G01J 1/00; G01J 1/42
[52] U.S. Cl. .................................... 250/353; 250/338; 250/352; 350/353
[58] Field of Search ............... 250/338, 342, 352, 353, 250/330, 333, 334, 474.1; 350/353, 354; 358/113; 332/4

[56] References Cited

U.S. PATENT DOCUMENTS

| | | | |
|---|---|---|---|
| 3,103,585 | 9/1963 | Johnson et al. | 250/352 |
| 3,397,313 | 8/1968 | Mast | 250/330 |
| 3,484,722 | 12/1969 | Barker, Jr. et al. | 332/4 |
| 3,617,745 | 11/1971 | Reed | 250/352 |
| 3,700,791 | 10/1972 | Bosomworth | 350/354 |
| 3,831,165 | 8/1974 | Chivian et al. | 350/353 |
| 4,160,907 | 7/1979 | Bly | 250/334 |
| 4,283,113 | 8/1981 | Eden | 350/96.15 |

Primary Examiner—Alfred E. Smith
Assistant Examiner—Carolyn E. Fields
Attorney, Agent, or Firm—Stephen S. Sadacca; James M. Cate; Charles S. Cotropia

[57] ABSTRACT

A dark field infrared telescope. Energy from an infrared scene is focused by a lens (10) onto a thermoptic modulator (12) comprising an optical structure (16) containing a thin film of vanadium dioxide disposed to form the faceplate of a conventional cathode ray tube. The modulator, normally nonreflecting of infrared energy, may have reflecting spots written at selected coordinates thereon by an electron beam from the cathode ray tube. A reflecting spot written on the modulator optically couples a selected element of the scene imaged on the modulator to an infrared detector (52) maintained at low temperature. A retroreflecting mirror (30), cold spectral filter (46), field lens (47), cold field stop (48) and cold pupil stop (50) are provided ahead of the detector to produce a low background flux cavity with the detector at one end and the retroreflecting mirror at the other. In its unswitched state, the modulator is nonreflecting and the scene image is not coupled to the detector. The cold detector thus looks back upon itself and sees a "dark field." Under the control of the sensor microprocessor (22), the electron beam is synchronously switched on and off to modulate the detector signal. The detector signal is then synchronously demodulated by a signal processor (56) to reduce the noise of the detector and preamplifier. By reducing background flux and detector noise, the sensor approaches a signal shot noise or electronic noise limited condition.

16 Claims, 4 Drawing Figures

DARK FIELD INFRARED TELESCOPE

TECHNICAL FIELD

The invention pertains to sensors and more particularly to infrared sensors for use in flight or surface vehicles.

BACKGROUND ART

Infrared sensors have been developed over the years for detecting infrared information emitted by natural scenes. Such sensors are particularly useful in navigation and military tactical applications.

The infrared scenes from which these sensors observe and extract information contain a wide variety of materials having emissivity and temperature variations which are spatially distributed to produce radiance contrast patterns. These patterns contain information necessary for contrast between natural figures and military targets and for navigation by map matching.

A major concern in the use of infrared sensors in such applications is the problem of infrared background radiation on the detector. Since the contrast of natural infrared scenes is relatively poor to begin with, control and reduction of background radiation and improvement of the signal to noise ratio is vital in such applications. Accordingly, an infrared sensor which minimizes background radiation and provides a good signal to noise ratio is needed for such applications.

DISCLOSURE OF THE INVENTION

In accordance with one embodiment of the invention, an infrared sensor is disclosed. An optical structure containing a vanadium dioxide thin film is disposed on the faceplate of a cathode ray tube to act as an infrared modulator. The optical structure is normally nonreflecting of infrared energy, but is capable of having reflecting spots written at selected locations thereon by an electron beam. Infrared detectors positioned to view the modulator provide a detector signal representative of the radiance of the scene element reflected from the modulator. The detectors, housed in a dewar vessel, are maintained at low temperature. Cold spectral filters, field stops and pupil stops are provided in the dewar vessel to provide a low flux detector cavity. A retroreflecting mirror is provided behind the modulator such that the detectors look back at themselves to see a "dark field."

In accordance with another embodiment of the invention, an infrared sensor, limited by either electronic noise or signal shot noise is disclosed. An optical structure containing a vanadium dioxide thin film is disposed on the faceplate of the cathode ray tube to act as an infrared modulator. The optical structure is normally nonreflecting of infrared energy, but is capable of having reflecting spots written at selected locations thereon by an electron beam. Infrared detectors, positioned to view the modulator, provide a detector signal representative of the radiance of the scene element reflected from the modulator. The electron beam is synchronously switched on and off to modulate the detector signal. The detectors, housed in a dewar vessel, are maintained at low temperature. Cold spectral filters, field stops and pupil stops are provided in the dewar vessel to provide a low flux detector cavity. A retroreflecting mirror is provided behind the modulator so that the detectors look back at themselves to see a "dark field." A signal processor, connected to the detectors and responsive to the detector signal, synchronously demodulates the detector signal to reduce detector and preamplifier noise.

DESCRIPTION OF THE DRAWINGS

For a more complete understanding of the present invention and for other obvious advantages thereof, reference is now made to the following description, taken in conjunction with the accompanying drawing in which.

DETAILED DESCRIPTION

Figure 1:
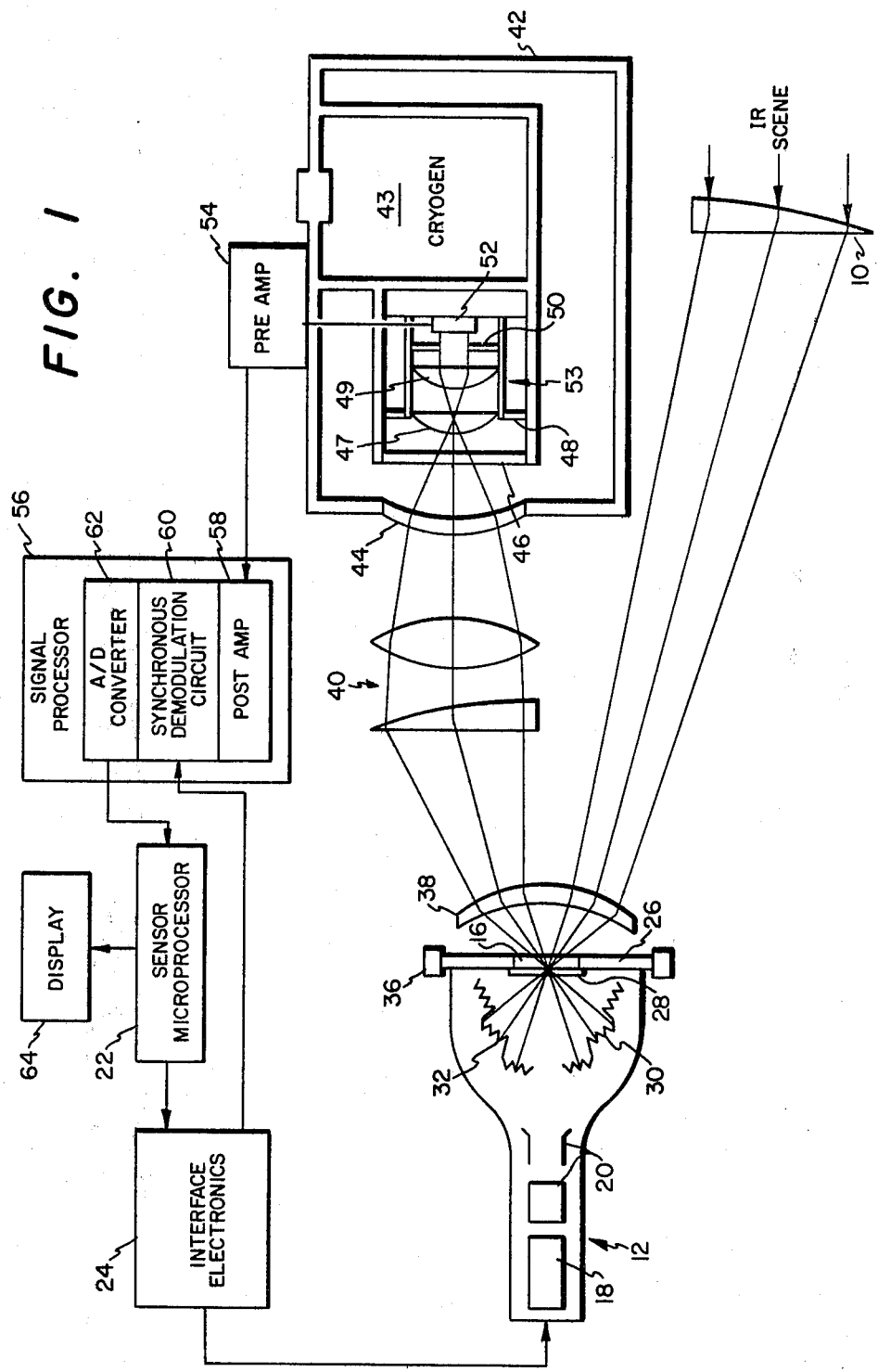
FIG. 1 is a schematic representation of the preferred embodiment of the present invention.

An infrared sensor's ability to measure the true radiance of a scene element is always limited by fluctuations on the detected and amplified output signal. These fluctuations (noise) are the summation of many noise sources. Reducing the dominant noise will improve the sensor's sensitivity. These noise sources fall into two groups: photon sources and electronic sources. The photons arriving at the detector are composed of signal photons and background photons. There will be fluctuation in the arrival rate of signal photons (signal shot noise) and fluctuation of the background photon arrival rate (background shot noise plus other background modulations that may be introduced by, for example, scanning). In many sensors, the dominant noise is from the background flux on the detector. These sensors are referred to as Background Limited Infrared Performance (BLIP) sensors.

Since an infrared detector accepts radiation from all directions, its field of view is $4\pi$ steradians. A detector positioned on a substrate or cold finger receives radiation from its support that is equal to approximately $5\pi$ steradians. For cryogenically cooled detectors, this contribution to background noise is usually very small and is neglected. Radiation from the forward $2\pi$ steradians is composed of signal flux from the scene received through the telescope and unwanted background radiation received from all other directions. If the forward $2\pi$ steradian field of view of each detector is restricted by cryogenically cooled stops to coincide with the telescope's field of view, background flux and therefore background noise is minimized. This is not accomplished in most sensors. Detectors with low internal noise are not therefore fully utilized because of the poor radiation environment of the detector.

In the dark field telescope, a retroreflecting mirror or a cold absorber outside a dewar is used in combination with cryogenically cooled stops, absorbers and spectral filters inside a dewar to provide the detector with low radiation from its total $4\pi$ steradian field of view. By placing a thermoptic modulator in the optical path between the dewar and a retroreflecting mirror or cold absorber, signal radiation can be selectively coupled from the telescope onto the detectors without increasing the background radiation. The full potential of a detector can thus be realized. At high signal levels, the sensor will be signal shot noise limited and at low signal levels the sensor will be limited by various electronic noise sources. The capability to temporally modulate the radiation received from a selected element of the field of view allows the use of a matched filter in the signal processor to also reduce electronic noise, especially 1/f or "colored" noise. The detector dark current (noise level with no signal present) can be measured while the modulator is off (nonreflecting) and then subtracted from the measurement containing signal plus noise. The frequency components of noise that are correlated over the sampling interval can thus be removed. By proper selection of the modulation waveform, the amount of signal energy lost can be minimized to produce near optimum signal recovery.

The dark field infrared telescope is based upon the emerging technology of thermoptic materials which permits localized modulation of infrared information incident at the image plane of the telescope to permit selected fields of view of the scene to be defined, excluding unwanted scene information and unwanted background flux on the detector. The physical phenomenon on which the thermoptic modulator technology is based is the sudden change in optical properties of certain materials at specific phase transition temperatures. In thermoptic materials such as, for example, thin films of the transition metal oxides, the change in crystal structure from the semiconductor to metal states is thermodynamically favored above the phase transition temperature. A sudden change in phase results in a sudden change in optical properties to produce the change from a nonreflecting to a reflecting state. Switching times between states are extremely short, on the order of nanoseconds. When properly designed, such thin films in the semiconductor state (below the transition temperature) are nonreflecting of energy at wavelengths in the infrared and even in the visible. When an area of the film or when the entire film is switched to its reflective state (above the phase transition temperature), this area of the film stack is highly reflective to infrared energy.

The thermoptic properties of various transition metal oxides have been studied and reported in the literature. Measurement of infrared reflectance and transmission of thin films of vanadium oxides has yielded excellent contrast ratios, particularly in thicknesses from 0.05 to 0.5 microns. These ratios have provided a base to allow the computer-aided design of an infrared thermoptic modulator containing vanadium dioxide thin films to produce specified performance characteristics in the 3–5 micron band and the 8–12 micron band. A typical application of a vanadium oxide thin film is as the faceplate of a conventional cathode ray tube. This arrangement is called an infrared thermoptic modulator. By controlled scanning of these films with an electron beam, localized areas on the films can be made highly reflective to relay elements of the image of an infrared scene to an off-axis detector. This eliminates the conventional mechanical scanning technique and provides rapid random access to any element of the scene image. Vanadium dioxide is a suitable material for both visible and infrared wavelength modulators. It is probably the most desirable transition metal oxide for most applications because the transition temperature of vanadium dioxide thin films is about 67° C., not too far above room temperature.

Another oxide of vanadium, $V_2O_3$, exhibits the same type of phase transition as $VO_2$ but at a lower temperature, −123° C. The DC electrical properties of the low and high temperature phases of $V_2O_3$ are similar to those of $VO_2$ with an even larger ratio of resistivity observed at the phase transition. From available data, it appears that the properties of $V_2O_3$ also make it a suitable material for applications in the infrared band. The transition energy of $V_2O_3$ is about the same as that of $VO_2$. This energy can be supplied with conventional cathode ray tube electron guns or lasers. The −123° C. transition temperature of $V_2O_3$ is compatible with a low background infrared sensor system. The optical properties of $V_2O_3$ at wavelengths in this band are such that high reflectance and nonreflectance contrasts can be achieved with relatively simple film structures.

A film stack or modulator containing a thin film of $VO_2$ or $V_2O_3$ and thin films of other infrared transparent materials such as germanium, silicon, sapphire, magnesium fluoride or calcium fluoride can be designed to provide high reflectance/nonreflectance ratio at any given wavelength in the infrared and at usable ratios in the visible band. The choice between $VO_2$ or $V_2O_3$ thin films is dictated primarily by ambient temperature considerations. At temperatures below 67° C., $VO_2$ films can be maintained in the nonreflecting state, whereas $V_2O_3$ must be held at temperatures below −123° C., which usually requires cryogenic cooling.

The proper control of the electron beam in a thermoptic modulator tube or other heating apparatus, such as, for example, a laser beam, permits reflecting spots of any size and location to be written on the normally nonreflecting modulator so that any portion of the infrared scene of interest may be viewed while excluding unwanted infrared radiation. By the proper control of the ambient temperature, reflecting spots written on the modulator can be maintained indefinitely or allowed to decay at times as rapidly as 0.3 microseconds. In the thermoptic modulator, spot sizes as low as 20 microns have been obtained. In film stacks in which laser beam switching has been employed, switching times as short as 35 nanoseconds have been observed with spot sizes as small as 5 microns. Clearly, these infrared thermoptic modulators are extremely rapid and provide precision control of the field of view. For further information about the optical properties of vanadium oxide thin films, reference is made to U.S. Pat. No. 4,283,113, entitled "Optical Modulation of Vanadium Oxide Thin Films".

Broadly speaking, the dark field telescope is an optical device in which a programmable infrared modulator is positioned in the image plane of the telescope objective ahead of an infrared detector positioned to view the modulator such that the optical path of the detector is selectively coupled with the optical path of the telescope objective by reflecting spots written on the modulator. This arrangement allows only energy intercepted by this spot on the modulator to be reflected to the detector. Various other components such as cold stops, cold filters, retroreflecting mirrors, cold absorbers and cryostats are employed in the detector optical cavity to reduce extraneous infrared background radiation from the modulator and other components from reaching the detector. Signal modulation is employed along with demodulation circuitry to reduce detector and preamplifier noise, making the dark field telescope essentially a signal shot noise limited, or electronic noise limited sensor rather than a background noise limited sensor.

FIG. 1 illustrates the dark field telescope of the present invention. Infrared radiation from a scene incident on a section of a conventional telescope objective lens 10 is focused onto a thermoptic modulator 12 disposed at the image plane of the telescope. Modulator 12 is a conventional cathode ray tube with an optical structure 16 disposed at the faceplate. The cathode ray tube contains an electrostatic focus gun 18 and electrostatic deflection plates 20 or alternatively, electromagnetic focus and/or deflection coils. The electron beam is synchronously switched on and off under the control of the sensor microprocessor 22, which sends appropriate signals to interface electronics 24 where digital signals are converted to analog signals and used with conventional table lookup electronics to provide control signals to electrostatic focus gun 18 and deflection plates 20. Alternatively, a scanable laser may be employed in place of an electron beam.

Optical structure 16 comprises a suitable optical substrate 26 and film stack 28 disposed on substrate 26, the materials for the substrate 26 and films in stack 28 being chosen to optimize the nonreflecting/reflecting characteristics at particular wavelengths of interest. Film stack 28 contains at least one vanadium dioxide thin film. Where infrared emission from the faceplate becomes the limiting noise feature of the system, $V_2O_3$ thin films may be employed along with a cryogenic cooling apparatus. By appropriate choice of materials and thicknesses, low thermal emission can be obtained.

A retroreflecting mirror 30 is provided behind the film stack to autocollimate the detector cavity. Mirror 30 may take one of several forms such as an array of small corner cubes (FIG. 1), a curved mirror or a lens-mirror combination. Retroreflecting mirror 30 causes the field of view of the detector to fold back on itself to form an optical cavity with the detector at one end and the retroreflecting mirror at the other. The field of view of the cavity is restricted by the cryogenically cooled elements to form a low background flux or "dark field" optical cavity. The thermoptic modulator is located in the cavity but since it has low reflectance in its normal state, infrared radiation focused on the modulator is not coupled into the low background flux detector cavity. The modulator is oriented such that when it is switched to its reflecting state, the infrared energy from the telescope is directed into the cavity field of view and onto the detector. In this condition, the optical components of the telescope are aligned with the coupled field of view of the detector. These optical components are also warm, but have very low emissivities and therefore do not contribute significantly to the detector's background flux. The optical component mounts are outside the cold stopped field of view and therefore do not contribute to the background flux on the detector. Infrared radiation from the scene that is within the cold stopped field of view can enter the telescope and reach the detectors when the modulator is "on" (reflective), but cannot when the modulator is "off" (nonreflective). The modulator can therefore be used to control the infrared energy from the scene that reaches the low background (dark field) flux cavity of the detector. An alternate form of the low background flux cavity is achieved by replacing the retroreflecting mirror with a low reflectance (black) cryogenically cooled stop. Infrared radiation from the stop is low because of its low temperature even though its emissivity is high. Since bodies that have high emissivities have low reflectance, infrared radiation from other sources is not reflected into the low background flux cavity of the detector.

The telescope cavity may also be autocollimated by providing a similar retroreflecting mirror 32 or absorber behind the film stack such that unwanted scene information which is not completely absorbed, but passed through the film stack, is reflected back through lens 10.

Temperature control devices 36, such as thermoelectric junctions or resistance wire, are provided adjacent the modulator faceplate to maintain a temperature of approximately 50° C., which is approximately 15° below the transition temperature of the vanadium dioxide thin film. This permits reflecting spots written on the modulator by electron beam heating to decay rapidly as the heated region returns to ambient temperature.

To facilitate collection of scene radiation reflected from modulator 12, a lens 38 is provided. Infrared energy reflected from the modulator is passed through lens 38 through additional low emissivity (warm) optical elements 40 to a dewar vessel 42 which houses the detectors. Dewar vessel 42 contains a cryogen 43 of liquid nitrogen or other suitable cryogenic liquid which maintains the detectors at a low temperature of about −196° C. A (warm) window 44 is provided to vessel 42 through which optical elements 40 focus infrared energy into the dewar to a spectral filter 46. Dewar window 44 may also be a lens element as shown in FIG. 1. Spectral filter 46 is a conventional optical filter designed to pass the optical band of interest. Alternatively, spectral filter 46 may also be a lens element or can be combined with other optical components, such as the field lens 47, condenser lens 49, pupil stop 50 or detector 52, by applying a suitable series of coatings to those components. Behind filter 46, a field lens 47 is supported by a cold field stop 48. Field stop 48 limits the total field of view of the detector cavity and excludes other sources of infrared energy. Within the dewar vessel 42, additional cold lenses, such as a condenser lens 49, are provided to focus the infrared energy onto a cold pupil stop 50 which further limits the energy incident on the detector 52. Alternatively, the condenser lens 49 may serve as the pupil stop 50.

Detector 52 is employed behind the cold pupil stop 50 to detect the radiant flux of that portion of the infrared scene reflected by the modulator. Alternatively, the detector 52 can also serve as the pupil stop. Detectors 52 are conventional infrared detectors, such as indium antimonide detectors, or other detectors such as lead selenide or mercury cadmium telluride, the choice of detector chosen depending upon the wavelength at which the telescope is to operate.

Figures 2, 3:
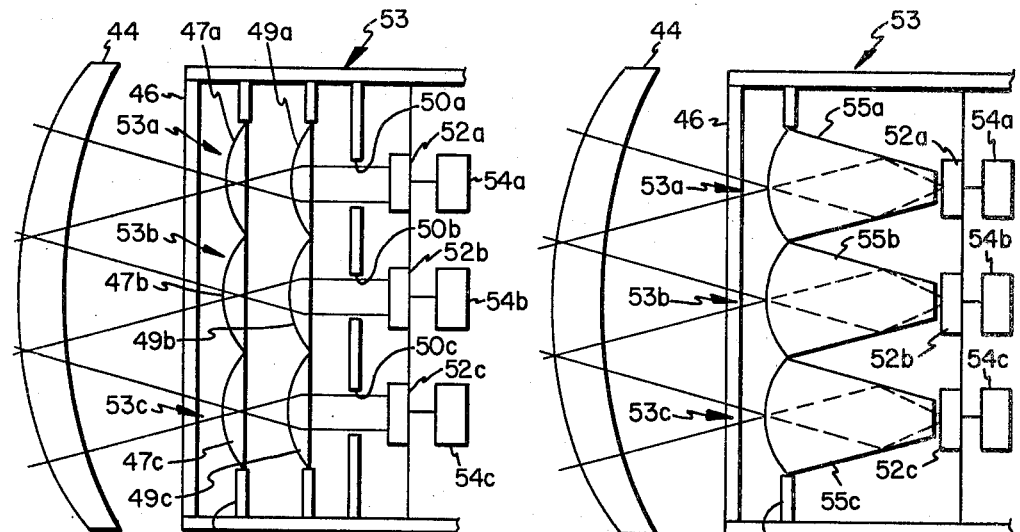
FIG. 2 is a schematic diagram of an array of detector subassemblies which may be used in the embodiment of FIG. 1.
FIG. 3 is a schematic diagram of an array of detector subassemblies employing light cones, which may be used in the embodiment of FIG. 1.

As shown in FIG. 2, the assembly 53 (FIG. 1) composed of field lens 47, condenser lens 49, pupil stop 50 and detector 52 may be subdivided into an array of smaller subassemblies 53a, 53b, 53c . . . to improve sensitivity and/or improve speed by making parallel detector output channels. Subdividing field lens 47 into an array of joined smaller lenses 47a, 47b, 47c . . . will cause each of the smaller lenses to act as a field stop which segments the telescope's field of view. An array of subassemblies 53a, 53b, 53c . . . will then make each segment of the field of view independent of the others. The subassemblies comprising elements 47a, 47b, 47c . . . , 49a, 49b, 49c, . . . and pupil stops 50a, 50b, 50c . . . provide higher optical gain and reduced noise. A multichannel preamplifier module 54a, 54b, 54c, . . . may be connected in parallel to each detector 52a, 52b, 52c . . .

in the subassemblies or a single preamplifier may be multiplexed between the detectors.

FIG. 3 shows an alternate embodiment of the optical structure for subassemblies 53a, 53b, 53c . . . As shown in FIG. 3, the optical structure of FIG. 2 may be replaced by condensing light cone elements 55a, 55b, 55c, . . . Elements 55a, 55b, 55c . . . are conventional elements made of refractive material having lens-shaped ends and highly polished sides.

Referring again to FIG. 1, it can be seen that images of the cold field stop and cold pupil stop are relayed through the optical system so that they lie inside the boundaries of the low emissivity optical components. Infrared emission from the supporting optical structure is thus prevented from impinging on the detectors. Infrared radiation from the scene which is within the field of view is prevented from reaching the detectors by designing the modulator to be nonreflecting in its normal state. All sources of background radiation are thus minimized to produce the desired dark field condition. Infrared radiation from a selected element of the scene is allowed to reach the detectors by writing a reflecting spot on the modulator with the electron beam.

The output signal of preamp module 54 is fed to a signal processor 56 which contains a postamplifier 58, a synchronous demodulation circuit 60 and circuitry 62 for converting the output of the demodulation circuit 60 to digital form for subsequent processing by sensor microprocessor 22.

Elements of the infrared scene of interest can be selectively scanned by writing a series of reflecting spots of selected size at selected coordinates on the modulator. By appropriately controlling the decay rate of the spots, multiple spots can be written on the modulator at the same time to permit more than one scene element to be viewed simultaneously. By snychronously switching the electron beam on and off under the control of sensor microprocessor 22, thereby modulating the radiation from the scene to produce the signal, background noise can be sampled when the field is dark and the background signal can be subtracted to reduce noise from the detectors and preamp module. The resulting signal in which background noise and electronic noise effects have been minimized is converted to digital form and fed to the sensor microprocessor where it is processed for display, if desired, at video display 64.

The temporally modulated signal is demodulated in circuit 60 by synchronously switching the signal into an integrator. The noise is synchronously sampled between the signal pulses, demodulated, scaled, and subtracted from the demodulated signal to reduce the DC and 1/f noise in the output signal.

Figure 4:
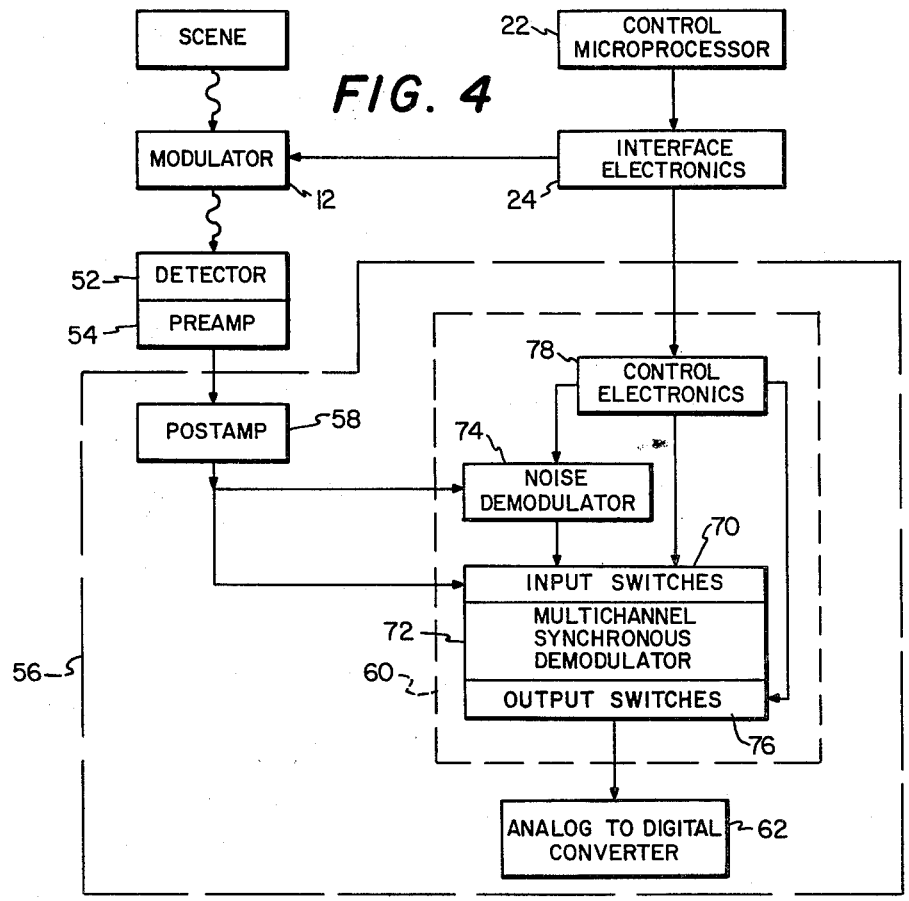
FIG. 4 is a schematic representation of the synchronous demodulation circuit of FIG. 1.

Reference is now made to FIG. 4, which is a schematic diagram of demodulation circuit 60. Microprocessor 22 or interface electronics 24 controls an array of electronic switches 70 whereby the signal from postamp 58 is integrated at appropriate times by one of integrators contained in the synchronous demodulator 72. Appropriate constants may scale each of the demodulated signals and subtraction of the scaled noise signal from the demodulated signal may be provided by the noise demodulator 74. The control electronics 78 with appropriate delay elements controls the switching and resetting of integrators in demodulator 72, as well as the output from the noise demodulator 74. Output switches 76 permit a filtered, demodulated output signal to be fed to A/D converter 62 at an appropriate time. Depending upon the requirements of the user, any number of integrators can be used in the circuit 60 to demodulate the signal for each detector.

The infrared dark field telescope described herein is an essentially electronic noise limited or signal shot noise limited sensor which provides free format sampling with improved signal to noise ratio necessary for tactical and commercial applications.

Although the present invention has been described with respect to specific embodiments thereof, it will be understood that various changes and modifications will be suggested to one skilled in the art, and it is intended to encompass such changes and modifications as fall within the scope of the appended claims.

We claim:

1. An optical sensor comprising:
    a thermoptic modulator positioned in an image plane of the sensor, said modulator having an optical structure substantially nonreflecting of optical energy;
    said modulator including means for selectively writing reflective spots at selected coordinates on said optical structure for reflecting optical energy at said reflective spots;
    detector means positioned to view said modulator for detecting only the optical energy reflected from said reflective spots written on said modulator, said detected optical energy corresponding to the optical energy from said reflective spots written on said modulator;
    means for substantially shielding said detector means from radiation other than radiation reflected from said reflective spots; and
    said detector means further including means for generating an output signal representing the radiance of the optical energy reflected from said reflective spots written on said modulator.

2. The sensor of claim 1 wherein said shielding means includes cold stop means.

3. The sensor of claim 1 wherein said modulator includes a vanadium dioxide thin film.

4. The sensor of claim 3 and further including temperature control means disposed adjacent said modulator for maintaining said modulator at a temperature of approximately 50° C.

5. The sensor of claim 1 wherein said modulator includes a $V_2O_3$ thin film.

6. The sensor of claim 1 and further including temperature control means disposed adjacent said detector means for maintaining said detector means at a low temperature.

7. The sensor of claim 1 wherein said detector means includes a plurality of detector means.

8. The sensor of claim 1 wherein said detector means include indium antimonide detector means.

9. The sensor of claim 1 wherein said detector means includes lead selenide detector means.

10. The sensor of claim 1 wherein said detector means include mercury cadmium telluride detector means.

11. The sensor of claim 1 and further including:
    a spectral filter positioned ahead of said detector means.

12. The sensor of claim 1 and including:
    a retroreflecting mirror positioned behind said modulator optical structure.

13. The sensor of claim 1 and further including:
    preamplifier means connected to said detector means and responsive to said output signal for amplifying said output signal.

14. The sensor of claim 1 and further including:
control means connected to said writing means for providing a control signal to synchronously switch said writing means on and off; and
signal processing means connected to said detector means and responsive to said control signal for synchronously demodulating said output signal to reduce detector and preamplifier noise.

15. The sensor of claim 14 wherein said signal processing means includes:
a first sampling means connected to said detector means and responsive to said control signal for sampling said output signal when said writing means is switched on to produce a first signal;
a second sampling means connected to said detector means and responsive to said control signal for sampling said output signal when said writing means is switched off to produce a second signal; and
means for subtracting said second signal from said first signal to produce a filtered, demodulated signal.

16. The sensor of claim 1 and further including:
display means connected to said detector means and responsive to said output signal for generating a video display of said output signal.

* * * * *